Patented Oct. 27, 1942

2,300,176

UNITED STATES PATENT OFFICE 2,300,176

RUBBER CHLORIDE PRECIPITATION

James Wallace Raynolds, Pittsburgh, Pa., assignor to The Raolin Corporation, Charleston, W. Va., a corporation of West Virginia No Drawing. Application July 31, 1939, Serial No. 287,641

3 Claims. (Cl. 260—772)

This invention relates to rubber chloride precipitation; and it comprises an improved method of recovering solid rubber chloride from solutions thereof, wherein a solution of rubber chloride, usually in a chlorinated hydrocarbon solvent, is intimately mixed with a liquid which is not a solvent for the rubber chloride, such as an alcohol, while subjecting the mixture to shearing stresses, advantageously in a colloid mill where precipitation of the rubber chloride takes place, followed by recovery of the rubber chloride in finely divided solid form, separate from the liquids which are present, said liquids being advantageously recovered for re-use; all as more fully hereinafter set forth and as claimed.

In the manufacture of rubber chloride, it has long been a problem to provide an efficient and economical method for the precipitation of solid chlorinated rubber from solution in the solvent in which chlorination is effected. Rubber chloride, as precipitated by previous methods, is usually a clumpy product, often something like popcorn, while a fine powder is wanted. It is, however, difficult to comminute the previous commercial types, and it involves an additional operation.

In the usual chlorinating operations, rubber is dissolved in a chlorinated solvent, such as carbon tetrachloride, to form a solution containing about 1 to 5 per cent of rubber by weight. Gaseous chlorine is passed through this solution, to react with the dissolved rubber until the desired stage of chlorination is reached. It is generally desirable to continue chlorination at least to the heptachloride stage, at which the final product contains about 65.13 per cent chlorine. Sometimes chlorination is carried further—to a product containing 67 per cent or more of chlorine. In any event, after conclusion of the chlorination, there is obtained a solution which generally contains about 5 to 10 per cent of rubber chloride. The rubber chloride is produced in solution by this procedure; usually as a solution in carbon tetrachloride.

For separating or recovering the rubber chloride from solution, various methods have been proposed. For example, it has been suggested that a thin stream of the chlorinated rubber solution be added slowly to a large volume of a non-solvent, such as alcohol, with violent agitation. This method effects precipitation of the rubber chloride in a lumpy form, and the agitating device rapidly becomes coated with a fibrous deposit of precipitated rubber chloride, and thus loses its efficiency quite rapidly. As an alternative, it has been proposed to add alcohol gradually to a large volume of chlorinated rubber solution, with considerable agitation. Precipitation can be effected more gradually in this way, but it becomes difficult to handle the mass of rubber chloride which is formed as precipitation progresses. Another suggested procedure involves emulsifying the chlorinated rubber solution and then removing the carbon tetrachloride or other solvent by steam distillation. In this method, however, there is also encountered the disadvantage that the rubber chloride is recovered as a large mass requiring further handling and disintegration. It has also been suggested that a thin stream of chlorinated rubber solution be introduced into boiling water which is violently agitated. The precipitated solid is then recovered from the surface of the water, while the solvent is evaporated and recovered elsewhere. It has been found difficult, however, to recover the solvent without substantial losses, and to recover a uniform solid rubber chloride product not needing comminution in some way.

All of these previously suggested processes have inherent difficulties, in addition to those mentioned, which have militated against their effective commercial operation. One of these disadvantages is that all such processes must be operated on an intermittent or batch basis. Another objection is that, with rubber chloride solutions of the higher viscosity types, the operation of these processes becomes increasingly difficult as the viscosity increases. There is a practical limit to the concentration of solutions which can be handled.

An object achieved in the present invention is the provision of a method of precipitating rubber chloride which can be used continuously, and which produces solid rubber chloride in the form of fine particles which can be readily removed from the liquids present.

In this invention, which is applicable to rubber chloride solutions of all viscosity types, I effect precipitation of rubber chloride in a colloid mill, comprising a stator and a rotor which revolves rapidly, advantageously in a horizontal plane. The mill develops shearing stresses in the solution undergoing precipitation. Commercially available colloid mills of the type mentioned are suitable for this purpose; for example, I have successfully conducted operations in accordance with this invention in a mill of the type manufactured by the Premier Mill Corporation of Geneva, N. Y., which is more fully described in U. S. Patents Nos. 1,523,623, 1,541,115, 1,690,667, 1,690,668 and 1,690,669.

Colloid mills of this type are ordinarily constructed with a smooth steel face on the rotor and on the stator, and the clearance between the rotor and stator is variable. In one mill the rotor was three inches in diameter and was driven at a speed of 7200 R. P. M. A thin stream of chlorinated rubber solution was introduced into an eye on one side of the stator and an approximately equal volume of methanol was introduced simultaneously at an eye diametrically opposite. With a clearance of 0.005 inch between the rotor and the stator, solid rubber chloride was precipitated and discharged as a uniformly fine powder suspended in a mixture of carbon tetrachloride and methanol. This mixture was easily filtered to eliminate the major portion of the liquids, and drying was readily competed in a vacuum drier.

While good results are obtained with colloid mills having smooth steel faces on the rotor and stator, I have found that better results are obtained when the stator and rotor have faces on which carborundum grit is bonded. For example, the grit may be applied in laminations, with a fine grit at the bottom and a coarser grit at the top. In one mill so constructed, the carborundum grit ranged in fineness from 12 mesh to 60 mesh. This mill had a six-inch rotor driven at 3600 R. P. M.; and in operating it in accordance with this invention chlorinated rubber solution was introduced on one side and a corresponding volume of methanol was introduced on the opposite side. The rubber chloride was precipitated continuously over long periods of time without difficulty from stoppage. In this respect, this mill was superior to mills having smooth faces on the rotor and stator, since, in the smooth surfaced mills, there is generally some tendency toward precipitation and accumulation of rubber chloride in the eye of the mill. This build-up of precipitated material makes it necessary to shut down the smooth surfaced mills occasionally to clean out the precipitated material accumulated around the feed pipes. As stated, no such difficulties were encountered when using the mill with carborundum grit on the faces of the rotor and stator.

In operation of the colloid mill in accordance with my invention, the solution of chlorinated rubber in carbon tetrachloride or other solvent is advantageously fed under gravity through a control valve to one eye in the stator, and methanol or other nonsolvent is fed in a similar manner to the opposite eye. The discharge opening of the mill is housed to prevent the escape of solvent vapor, and the combined liquids (methanol and carbon tetrachloride) and precipitated solid are conveniently discharged into a continuous vacuum filter. The partially dried solid recovered from the filter is in turn discharged into a vacuum drier, where the remaining solvent is removed. Upon discharge of the solid from the vacuum drier, it is found to be in the form of fine and uniform particles. This form is much superior to the forms in which solid rubber chloride was previously obtained by precipitation, and it is produced very economically in accordance with this invention.

The methanol and carbon tetrachloride separated from the precipitated rubber chloride in accordance with this invention, by filtering or drying or both, are readily recovered for re-use with very little loss. One convenient method of effecting this recovery is described in more detail in my copending application, Serial No. 245,293, and consists essentially of diluting the mixed liquids with a suitable quantity of water, agitating, separating the supernatent water-alcohol layer from the tetrachloride layer, and distilling the layers separately.

In the precipitation of rubber chloride in accordance with this invention, the size of the final particles may be varied by adjusting the clearance between the rotor and the stator in the colloid mill. This variation is ordinarily from 0.002 to 0.015 inch, with a clearance of about 0.005 inch resulting in a product suitable for most purposes. The density of the final product may also be varied by varying the volume of methanol used for precipitation. Increasing the volume of methanol above the equal volume mentioned hereinabove, results in a less dense and more fluffy final product.

So far as I have been able to ascertain, this method of precipitating rubber chloride is satisfactory, and, in fact, superior to previous methods, with all types of rubber chloride solutions which are produced in commercial chlorinating operations of the solution type. It appears that there is no substantial lowering of the viscosity of the final product by passage through the colloid mill, and that no other physical property is substantially changed by this method of precipitation, except that the product is obtained in a more uniform condition.

While, as stated, the method of precipitating rubber chloride constituting this invention is useful in connection with various prior processes for preparing rubber chloride solutions, I find it exceptionally advantageous for use with the solutions prepared in accordance with the invention of my copending application, Serial No. 245,293, of which this application is a continuation-in-part. In accordance with the said prior application, rubber chloride solutions of great purity and other exceptional characteristics are produced, and when the solid rubber chloride is recovered from such solutions in accordance with the present invention, an outstanding product results.

What I claim is:

1. The method of precipitating rubber chloride from a solution thereof, which comprises simultaneously feeding a stream of solution of chlorinated rubber in a solvent therefor, and a stream of non-solvent liquid into a narrow confined space to sheering stresses applied at a temperature below the boiling point of said solvent by rotating said thin layer rapidly in contact with carborundum grit, and thereby rapidly precipitating the rubber chloride from the solution in finely divided form, continuously withdrawing the precipitated rubber chloride and the liquids from the said confined space, and separating the rubber chloride from the liquids.

2. The method of precipitating rubber chloride from a solution thereof, which comprises simultaneously feeding a stream of solution of chlorinated rubber in a solvent therefor, and a stream of non-solvent liquid into a narrow confined space to sheering stresses applied at a temperature below the boiling point of said solvent by rotating said thin layer rapidly in contact with abrasive grit, and thereby rapidly precipitating the rubber chloride from the solution in finely divided form, continuously withdrawing the precipitated rubber chloride and the liquids from the said confined space, and separating the rubber chloride from the liquids.

3. The method of precipitating rubber chloride from a solution thereof, which comprises simultaneously feeding a stream of solution of chlorinated rubber in a solvent therefor, and a stream of non-solvent liquid into a narrow confined space to sheering stresses applied at a temperature below the boiling point of said solvent by rotating said thin layer rapidly in contact with abrasive grit, and thereby rapidly precipitating the rubber chloride from the solution in finely divided form.

JAMES WALLACE RAYNOLDS.